(12) United States Patent
Karlicek, Jr. et al.

(10) Patent No.: US 12,533,049 B2
(45) Date of Patent: Jan. 27, 2026

(54) PATIENT MONITORING SYSTEM

(71) Applicant: RENSSELAER POLYTECHNIC INSTITUTE, Troy, NY (US)

(72) Inventors: Robert F. Karlicek, Jr., Mechanicville, NY (US); Richard J. Radke, Slingerlands, NY (US); Arunas Tuzikas, Troy, NY (US); Claire F. Karlicek, Mechanicville, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 386 days.

(21) Appl. No.: 17/598,986

(22) PCT Filed: Mar. 30, 2020

(86) PCT No.: PCT/US2020/025637
§ 371 (c)(1),
(2) Date: Sep. 28, 2021

(87) PCT Pub. No.: WO2020/198730
PCT Pub. Date: Oct. 1, 2020

(65) Prior Publication Data
US 2022/0183589 A1   Jun. 16, 2022

Related U.S. Application Data

(60) Provisional application No. 62/825,349, filed on Mar. 28, 2019.

(51) Int. Cl.
*A61B 5/11* (2006.01)
*A61B 5/00* (2006.01)
(Continued)

(52) U.S. Cl.
CPC .......... *A61B 5/1113* (2013.01); *A61B 5/1128* (2013.01); *A61B 5/6889* (2013.01);
(Continued)

(58) Field of Classification Search
None
See application file for complete search history.

(56) References Cited

U.S. PATENT DOCUMENTS 8,902,068 B2    12/2014  Bechtel et al.
9,363,859 B2    6/2016   Karlicek, Jr. et al.
(Continued)

OTHER PUBLICATIONS

Bhattacharya et al, "Array of single pixel time-of-flight sensors for privacy preserving tracking and coarse pose estimation", IEEE, 2016 (Year: 2016).*

(Continued)

*Primary Examiner* — Michael J Carey
*Assistant Examiner* — Marjan Saboktakin
(74) *Attorney, Agent, or Firm* — Barclay Damon LLP; Anthony P. Gangemi

(57) ABSTRACT

One embodiment provides a sensor module for patient monitoring. The sensor module includes a processor circuitry; a memory circuitry; at least one time of flight (TOF) sensor; a TOF logic; and a monitor logic. The TOF logic is configured to determine a sequence of elevation maps of at least a portion of a patient room. The TOF logic is further configured to at least one of a distance vector and a velocity vector associated with a selected room occupant based, at least in part, on a plurality of elevation maps in the sequence of elevation maps. Each elevation map is determined based, at least in part, on a respective TOF data set captured from the at least one TOF sensor. Each TOF data set is captured, periodically at a time interval. The monitor logic is configured to classify an activity of the selected room occupant as acceptable or unacceptable. The classifying is based, at least in part, on the at least one of the distance vector and the velocity vector.

13 Claims, 5 Drawing Sheets

(51) Int. Cl.
    *G01S 17/58*     (2006.01)
    *G01S 17/89*     (2020.01)

(52) U.S. Cl.
    CPC ............ *A61B 5/7267* (2013.01); *G01S 17/58* (2013.01); *G01S 17/89* (2013.01); *A61B 5/0077* (2013.01)

(56) References Cited

U.S. PATENT DOCUMENTS

| | | | |
|---|---|---|---|
| 9,785,744 B2 | 10/2017 | Johnson et al. | |
| 10,186,124 B1* | 1/2019 | Mullins | G08B 13/1968 |
| 2009/0027225 A1* | 1/2009 | Farley | G08B 7/06 |
| | | | 340/6.11 |
| 2012/0075464 A1 | 3/2012 | Derenne et al. | |
| 2012/0154582 A1* | 6/2012 | Johnson | G06Q 10/00 |
| | | | 340/521 |
| 2014/0108041 A1* | 4/2014 | Bechtel | G16H 50/50 |
| | | | 705/2 |
| 2015/0112151 A1 | 4/2015 | Muhsin et al. | |
| 2016/0295193 A1 | 10/2016 | Van Nieuwenhove et al. | |
| 2017/0055917 A1 | 3/2017 | Stone et al. | |
| 2018/0000407 A1* | 1/2018 | Johnson | A61B 5/1126 |
| 2018/0264391 A1 | 9/2018 | Kirschman | |

OTHER PUBLICATIONS

International Search Report and the Written Opinion of the International Searching Authority, International Application No. PCT/US2020/025637, mailed Jun. 25, 2020.

Diraco, G., et al., "An Active Vision System for Fall Detection and Posture Recognition in Elderly Healthcare," ResearchGate, vol. 10, Conference Paper, pp. 1-6, Mar. 2010.

* cited by examiner

US 12,533,049 B2

PATIENT MONITORING SYSTEM

CROSS REFERENCE TO RELATED APPLICATION(S)

This application claims the benefit of U.S. Provisional Application No. 62/825,349, filed Mar. 28, 2019, which is incorporated by reference as if disclosed herein in its entirety.

GOVERNMENT LICENSE RIGHTS

This invention was made with government support under grants EEC0812056 awarded by the National Science Foundation and DE-AR0000942 awarded by the Department of Energy. The government has certain rights in the invention.

FIELD

The present disclosure relates to a patient monitoring system, in particular to, a patient monitoring system with improved individual privacy.

BACKGROUND

Cameras can be used to monitor the activity of humans in a wide variety of settings, but in some cases pose issues with regard to patient privacy. For example, cameras are being considered and in some cases installed in healthcare facilities for monitoring patient movement and locations as well as patient interactions with staff and visitors. While it is clear that cameras can provide detailed information on patient movement and staff interaction with the patient and can even document neglect and abuse, it is equally clear that capturing such information can invade the privacy of the patient.

SUMMARY

In some embodiments, there is provided a sensor module for patient monitoring. The sensor module includes a processor circuitry; a memory circuitry; at least one time of flight (TOF) sensor; a TOF logic; and a monitor logic. The TOF logic is configured to determine a sequence of elevation maps of at least a portion of a patient room. The TOF logic is further configured to at least one of a distance vector and a velocity vector associated with a selected room occupant based, at least in part, on a plurality of elevation maps in the sequence of elevation maps. Each elevation map is determined based, at least in part, on a respective TOF data set captured from the at least one TOF sensor. Each TOF data set is captured, periodically, at a time interval. The monitor logic is configured to classify an activity of the selected room occupant as acceptable or unacceptable. The classifying is based, at least in part, on the at least one of the distance vector and the velocity vector.

In some embodiments of the sensor module, the monitor logic is configured to notify a facility management system if the classification corresponds to unacceptable, or log the activity of the selected room occupant if the classification corresponds to acceptable.

In some embodiments of the sensor module, the TOF logic is configured to determine whether the patient room is occupied based, at least in part, on a baseline elevation map.

In some embodiments of the sensor module, the monitor logic is trained using a machine learning technique. In some embodiments of the sensor module, the TOF data set is captured from a plurality of TOF sensors. In some embodiments of the sensor module, the monitor logic is configured to receive TOF data from a secondary sensor module.

In some embodiments, there is provided a method. The method includes determining, by a time of flight (TOF) logic, a sequence of elevation maps of at least a portion of a patient room. Each elevation map is determined based, at least in part, on a respective TOF data set captured from at least one TOF sensor. Each TOF data set is captured, periodically, at a time interval. The method further includes determining, by the TOF logic, at least one of a distance vector and a velocity vector associated with a selected room occupant based, at least in part, on a plurality of elevation maps in the sequence of elevation maps. The method further includes classifying, by a monitor logic, an activity of the selected room occupant as acceptable or unacceptable. The classifying is based, at least in part, on the at least one of the distance vector and the velocity vector.

In some embodiments, the method further includes notifying, by the monitor logic, a facility management system if the classification corresponds to unacceptable or logging by the monitor logic, the activity of the selected room occupant if the classification corresponds to acceptable.

In some embodiments, the method further includes determining, by the TOF logic, whether the patient room is occupied based, at least in part, on a baseline elevation map.

In some embodiments of the method, the monitor logic is trained using a machine learning technique. In some embodiments of the method, the TOF data set is captured from a plurality of TOF sensors. In some embodiments of the method, the plurality of TOF sensors is included in a single sensor module.

In some embodiments, the method further includes determining, by the monitor logic, a number of room occupants based, at least in part, on a selected elevation map and classifying the number of room occupants as acceptable or unacceptable based, at least in part, on a policy.

In some embodiments, there is provided a patient monitoring system. The system includes a primary sensor module; and at least one secondary sensor module coupled to the primary sensor module. The primary sensor module includes a processor circuitry, a memory circuitry, at least one time of flight (TOF) sensor, a TOF logic and a monitor logic. The TOF logic is configured to determine a sequence of elevation maps of at least a portion of a patient room. The TOF logic is further configured to at least one of a distance vector and a velocity vector associated with a selected room occupant based, at least in part, on a plurality of elevation maps in the sequence of elevation maps. Each elevation map is determined based, at least in part, on a respective TOF data set captured from the at least one TOF sensor. Each TOF data set is captured, periodically, at a time interval. The monitor logic is configured to classify an activity of the selected room occupant as acceptable or unacceptable. The classifying is based, at least in part, on the at least one of the distance vector and the velocity vector.

In some embodiments of the system, the monitor logic is configured to notify a facility management system if the classification corresponds to unacceptable, or log the activity of the selected room occupant if the classification corresponds to acceptable.

In some embodiments of the system, the TOF logic is configured to determine whether the patient room is occupied based, at least in part, on a baseline elevation map. In some embodiments of the system, the monitor logic is trained using a machine learning technique.

In some embodiments of the system, the TOF data set is captured from a plurality of TOF sensors. In some embodiments of the system, the monitor logic is configured to receive TOF data from each secondary sensor module.

In some embodiments, there is provided a computer readable storage device. The storage device has stored thereon instructions that when executed by one or more processors result in the operations according to any embodiment of the method.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1:
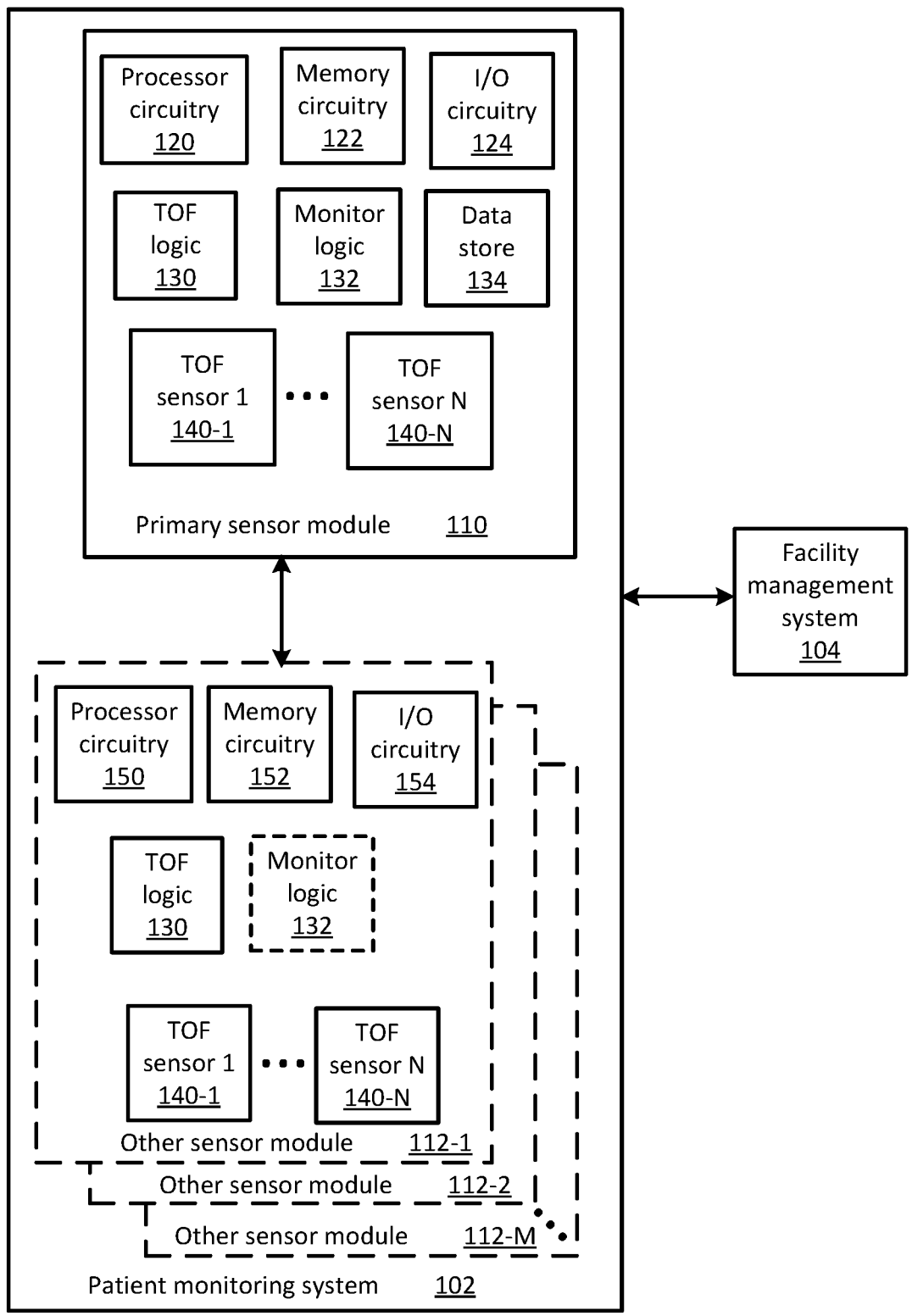
FIG. 1 illustrates a functional block diagram of a system including a patient monitoring system consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

A non-imaging technology configured to document patient room occupancy, patient movement and interactions between patient and the facility staff members without necessarily identifying specific persons may improve patient care and security without invading privacy.

Generally, this disclosure relates to a patient monitoring system. An apparatus, method and/or system are configured to capture time of flight (TOF) data from one or more TOF sensors positioned in or on a ceiling of a patient room. The TOF sensors may be configured to capture TOF data for at least a portion of the patient room where the portion may be related to a field of view of the TOF sensors. The apparatus, method and/or system may then be configured to determine whether or not the patient room is occupied. If the patient room is occupied, current TOF data may be captured. A current elevation map may be determined based, at least in part, on the captured current TOF data and based, at least in part, on a room ceiling height. The current elevation map may then correspond to heights associated with room elements and/or room occupants. As used herein, "room occupant" corresponds to a human and includes a patient, a staff person, a visitor or an unknown person. The current elevation map may cover at least a portion (i.e., a portion or all) of a patient room. A sequence of TOF data sets may then be captured with each TOF data set captured, periodically, at a time interval. For example, the time interval may have a time duration on the order of tenths, ones, or tens of seconds. A corresponding sequence of elevation maps may then be determined. A distance vector and/or a velocity vector associated with a selected room occupant may then be determined based, at least in part, on a plurality of elevation maps included in the sequence of elevation maps. An activity of the selected room occupant may then be classified as acceptable or unacceptable based, at least in part, on at least one of the distance vector and the velocity vector. Acceptable activities may be logged and unacceptable activities may trigger a notification to a facility management system.

The TOF data may be associated with one or more pixels and are not configured to yield image data, thus preserving patient privacy. The TOF data may be captured from one or more TOF sensors. In an embodiment, a plurality of TOF sensors may be included in a single (e.g., primary) sensor module. In one nonlimiting example, the primary sensor module may be positioned relative to a patient bed. In another embodiment, each of a plurality of sensor modules may include one or more TOF sensors and the sensor modules may be distributed over a ceiling of the patient room. In this embodiment, at least some of the plurality of sensor modules may be interconnected, wired and/or wirelessly, in a network.

FIG. 1 illustrates a functional block diagram of a system 100 including a patient monitoring system 102 consistent with several embodiments of the present disclosure. System 100 may further include a facility management system 104. Patient monitoring system 102 is configured to detect and classify room occupant activity related to patient care in a healthcare facility. Room occupant activity may be determined based, at least in part, on occupant position and/or occupant motion. Occupant position (e.g., pose and location) and occupant motion (e.g., change of location, change of pose, direction of change(s), velocity of motion, etc.) may be determined based, at least in part, on a time of flight (TOF) measurement from/to a TOF sensor positioned in or on the room ceiling, as will be described in more detail below. The TOF measurements are configured to support determining occupant position and occupant motion without capturing visual images and may thus maintain patient privacy.

Room occupant activity may be classified as normal (i.e., acceptable) or abnormal (i.e., unacceptable). An acceptable activity may be logged and an unacceptable activity may trigger a notification to, for example, a facility management system. Unacceptable activities may include, but are not limited to, unusually passive patient (e.g., no patient movement for an extended period of time) or unusually active patient (e.g., distance and/or velocity vectors associated with the patient greater than a threshold for at least a predefined time period), patient unattended for extended period of time (e.g., without second room occupant for an extended period of time, the extended period of time exceeding a predefined number of hours or days), patient spending an extended period of time in the bathroom, patient has fallen, patient getting out of bed, a second room occupant on the bed with the patient, patient has left the bed and/or the patient is resisting a caregiver, etc. Additionally or alternatively, a room activity may be classified as acceptable or unacceptable. Unacceptable room activities may include, but are not limited to, too many room occupants (e.g., a number of room occupants exceeding a threshold), an unexpected second room occupant (e.g., a visitor outside of visiting hours), etc. Whether a room activity is acceptable or unacceptable may be based, at least in part, on a policy. The policy may be set, for example, by the facility management system 104. As used herein, facility management system may include a nurses station, electronic medical records, building management systems and/or security.

Patient monitoring system 102 includes a primary sensor module 110. In some embodiments, patient monitoring system 102 may further include one or more other sensor modules 112-1, . . . , 112-M. Each sensor module 110, 112-1, . . . , and/or 112-M may be positioned in or on a ceiling of a patient room.

Figure 2:
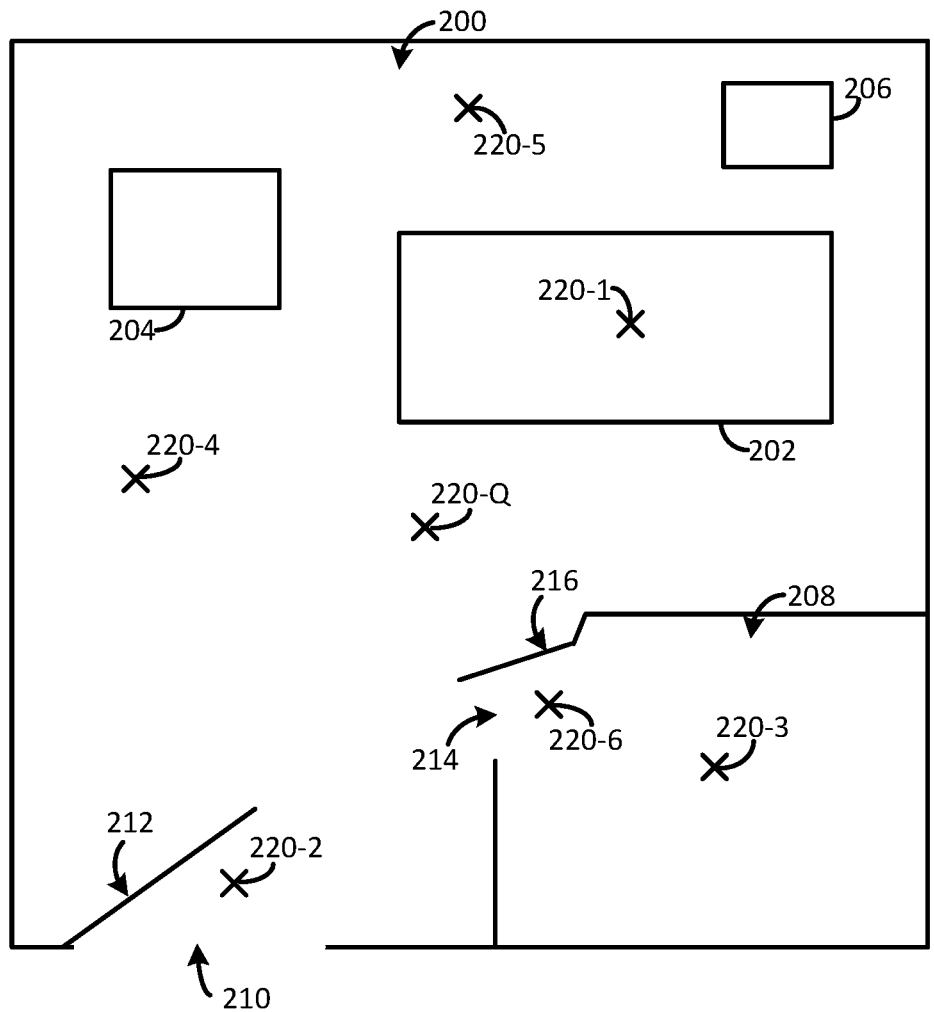
FIG. 2 illustrates a top view of one example patient room including a patient monitoring system consistent with several embodiments of the present disclosure.

FIG. 2 illustrates a top view of one example patient room 200 including a patient monitoring system consistent with several embodiments of the present disclosure. It may be appreciated that FIG. 2 is simplified, with room elements indicated by rectangles and squares to illustrate position in the room 200. FIG. 2 may be best understood when considered in combination with FIG. 1. In general, the patient room 200 may contain a hospital bed 202, a chair 204, medical equipment, e.g., medical equipment 206, and a bathroom 208. The patient room 200 may further include a room entrance 210 and a corresponding entry door 212. The bathroom 208 includes a bathroom entrance 214 and a corresponding bathroom door 216.

One or more sensor module(s), e.g., primary sensor module 110 and/or one or more of other sensor modules 112-1, 112-2, . . . , 112-M, may be positioned at one or more locations 220-1, 220-2, . . . , 220-Q in the patient room. If a plurality of sensor modules are included in the room, they may be coupled, wired and/or wirelessly, in a network. In one nonlimiting example, the plurality of sensor modules may be coupled in a mesh network. At least some of the sensor module locations may be positioned relative to one or more of the room elements. In an embodiment, a single sensor module may be positioned in the patient room 200. For example, the primary sensor module 110 may be positioned relative to the hospital bed 202 at, for example, location 220-1.

In some embodiments, a plurality of sensor modules may be uniformly positioned in the patient room 200. In one nonlimiting example, the plurality of sensor modules may be distributed over at least a portion of the patient room in, for example, a grid pattern. In another embodiment, at least some of the plurality of sensor modules may be positioned strategically about the room. For example, the primary sensor module 110 may be positioned relative to the hospital bed 202 at location 220-1 and a first other sensor module, e.g., other sensor module 112-1, may be positioned in the bathroom 208 at location 220-3. The first other sensor module may then be configured to monitor a patient in the bathroom. In another example, in addition or alternatively to the first sensor module, a second other sensor module, e.g., other sensor module 112-2, may be positioned near the entrance 210 to the patient room at location 220-2. The second other sensor module may then be configured to capture individual(s) entering or exiting the room 200.

In another example, the primary sensor module may be positioned over the bed at location 220-1, a first other sensor module may be positioned near the entrance 210 to the room at location 220-2, a second other sensor module may be positioned in the bathroom 208 at location 220-3, a third sensor module may be positioned near the chair 204 at location 220-4, a fourth other sensor module may be positioned beside the bed 202 at location 220-5, a fifth other sensor module may be positioned near an entrance 214 to the bathroom at location 220-6 and another sensor module may be positioned near a center of the room at location 220-Q. It may be appreciated that a total number of sensor modules positioned in a patient room may be related to a size of the room, a number and/or configuration of room elements and/or a typical room activity. Thus, as few as one and as many as Q sensor modules may be positioned in a patient room. For example, Q may be on the order of ten. In another example, Q may be on the order of 100.

Figure 3:
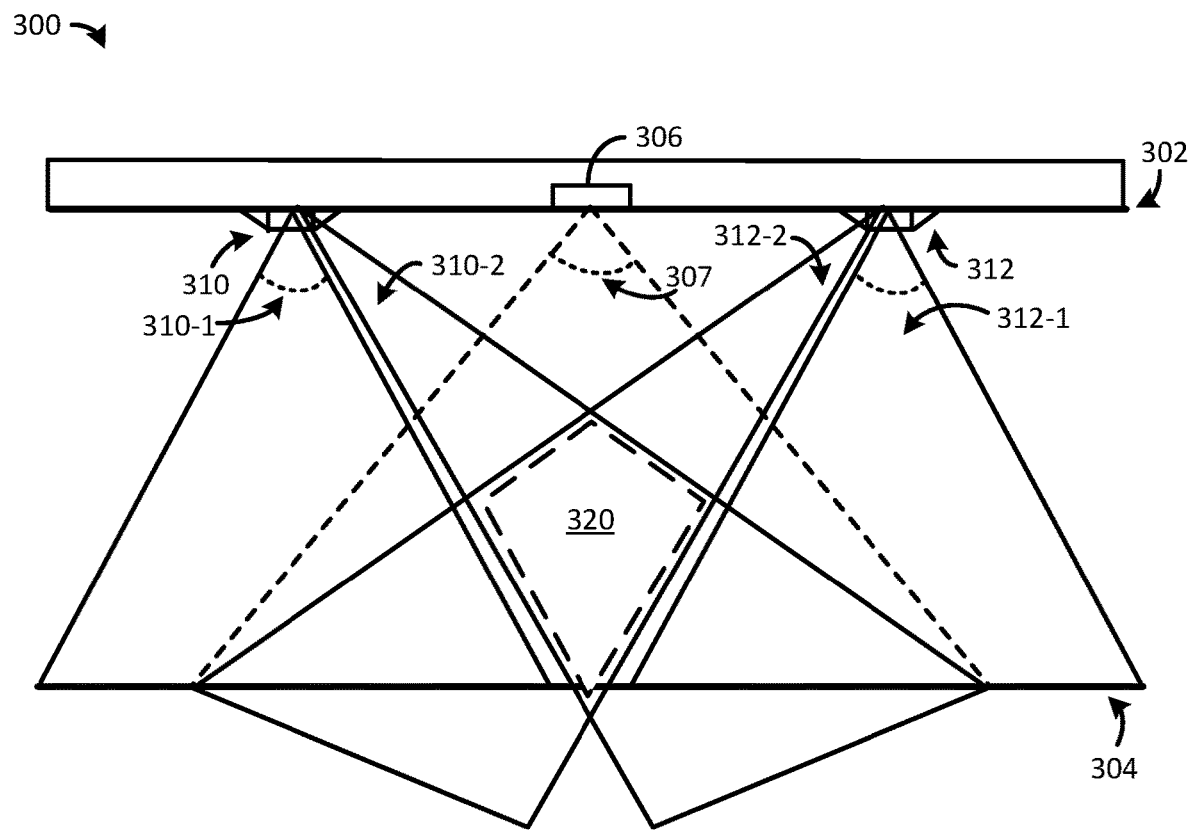
FIG. 3 is a side view of an example patient room (without room elements) illustrating converging fields of view of two sensor modules.

FIG. 3 is a side view of an example patient room 300 (without room elements) illustrating converging fields of view of two sensor modules. Example patient room 300 includes a ceiling portion 302 and a floor portion 304. The ceiling portion 302 contains a light fixture 306 having an illumination field 307. Example patient room 300 further includes two sensor modules 310, 312. In this example, each sensor module 310, 312 includes a plurality of TOF sensors. For example, sensor module 310 may correspond to a primary sensor module and sensor module 312 may correspond to a secondary sensor module. However, this disclosure is not limited in this regard. Example patient room 300 includes two fields of view 310-1, 310-2 for sensor module 310 and two fields of view 312-1, 312-2 for sensor module 312. Each field of view may correspond to a respective TOF sensor. It may be appreciated that fields of view for a plurality of sensor modules may overlap. For example, region 320 is a converging sensor field-of-view and corresponds and overlap between sensor module 310 field-of-view 310-2 and sensor module 312 field of view 312-2. Thus, a plurality of sensor modules may be configured to cover a relatively wide field of view and one room location may be covered by more than one TOF sensor.

Turning again to FIG. 1, primary sensor module 110 includes processor circuitry 120, memory circuitry 122 and input/output (I/O) circuitry 124. Primary sensor module 110 includes time of flight (TOF) logic 130, monitor logic 132 and a data store 134. Primary sensor module 110 may include one or more TOF sensors 140-1, . . . , and/or 140-N. Processor circuitry 120 is configured to perform the operations of primary sensor module 110. Data store 134 may be included in memory circuitry 122 and may be configured to store a room height value, patient room baseline elevation data, TOF data, a sequence of elevation map data sets, a sequence of distance vector data and/or velocity vector data associated with a selected room occupant, policy information (e.g., unacceptable activity information including time duration thresholds, number of room occupant threshold, time of day threshold, notification criteria, etc.), etc. I/O circuitry 124 may be configured to couple primary sensor module 110, wired and/or wirelessly, to facility management system 104 and/or one or more other sensor modules 112-1, 112-2, . . . , 112-M.

Each other sensor module, e.g., other sensor module 112-1, includes processor circuitry 150, memory circuitry 152 and input/output (I/O) circuitry 154. Other sensor module 112-1 includes time of flight (TOF) logic 130 and may include monitor logic 132. Other sensor module 112-1 may include one or more TOF sensors 140-1, . . . , and/or 140-N. Processor circuitry 150 is configured to perform the operations of other sensor module 112-1. Memory circuitry 152 may be configured to store TOF data, etc. I/O circuitry 154 may be configured to couple other sensor module 112-1, wired and/or wirelessly, to primary sensor module 110. In some embodiments, I/O circuitry 154 may be configured to couple other sensor module 112-1, wired and/or wirelessly, to one or more other sensor modules 112-2, . . . , 112-M. In one nonlimiting example, primary sensor module 110 and one or more other sensor module(s) 112-1, . . . , 112-M may be coupled in a mesh network. However, this disclosure is not limited in this regard.

In operation, primary sensor module 110 may be configured to operate as a single sensor module or as a "master"

sensor module of a plurality of sensor modules. In other words, each other sensor module 112-1, 112-2, . . . , 112-M, may be configured to capture TOF data and to provide the TOF data, distance data and/or elevation map data to the primary sensor module 110 for further analysis and/or selected room occupant activity classification. Thus, in an embodiment, primary sensor module 110 and, e.g., monitor logic 132, may be configured to perform patient monitoring system 102 functions as a single sensor module based, at least in part, on TOF data collected by the primary sensor module 110. In another embodiment, primary sensor module 110 may be configured to perform patient monitoring system 102 functions as the primary sensor module in a system that includes one or more other (i.e., secondary) sensor modules. In this embodiment, primary sensor module 110, e.g., monitor logic 132, may perform patient monitoring system 102 functions based, at least in part, on TOF data collected by the primary sensor module 110 and the one or more other sensor module(s) 112-1, 112-2, . . . , and/or 112-M. The patient monitoring system 102 is thus configured to provide flexibility in its implementation.

Each TOF sensor, e.g., TOF sensor 140-1, is configured to emit an emitted light signal (e.g., visible and/or infrared) and to detect a reflected light signal. A relative timing between emission of the emitted light signal and the detection of the reflected light signal (i.e., time of flight) may then be utilized to determine a distance between the TOF sensor and an object that reflected the light signal. In one nonlimiting example, the time of flight associated with TOF sensor 140-1 may correspond to one pixel. In another nonlimiting example, the time of flight associated with TOF sensor 140-1 may be related to a plurality, e.g., an array, of pixels. A number of pixels included and the TOF data may be related to a field of view of each TOF sensor.

In an embodiment, each TOF sensor 140-1, . . . , 140-N may be configured to emit light encoded with a predefined modulation pattern and to detect the predefined modulation pattern in a received reflected light. A corresponding TOF may then be determined based, at least in part, on the relative timing of the emitted light in the received light. In one nonlimiting example the predefined modulation pattern may correspond to a predetermined modulation pattern described in U.S. Pat. No. 9,363,859, the contents of which are hereby incorporated by reference herein. However, this disclosure is not limited in this regard.

In an embodiment, a plurality of TOF sensors 140-1, . . . , 140-N may be included in a sensor module. Each TOF sensor may be positioned in the sensor module to provide a generally continuous combined field-of-view for the sensor module.

Figure 4A:
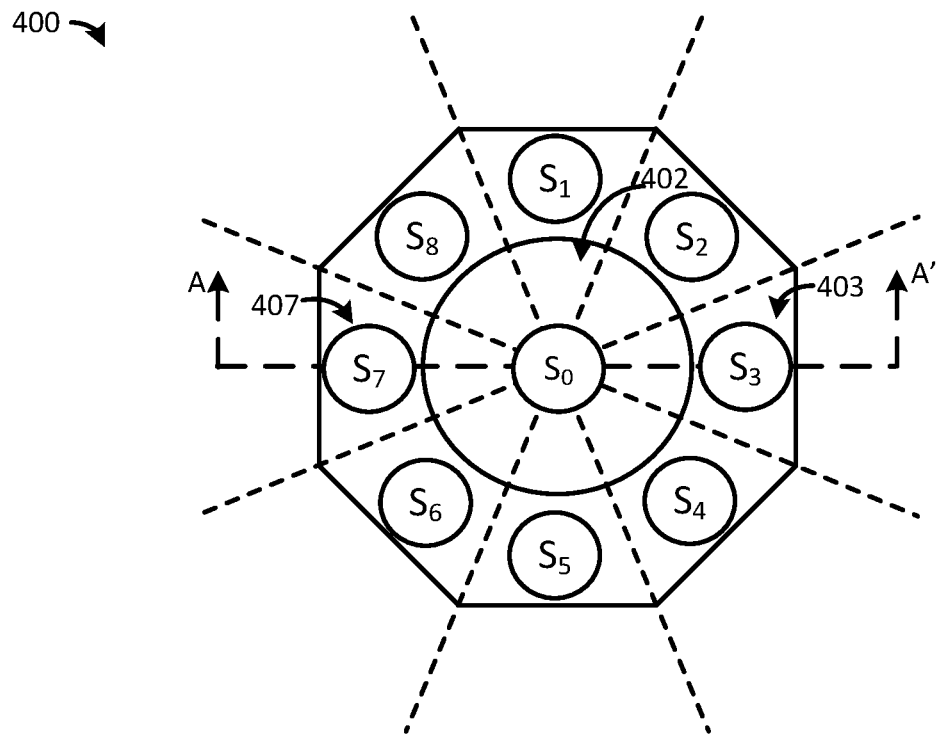
FIG. 4A illustrates an active surface view of one example sensor module that contains a plurality of time of flight (TOF) sensors.
Figure 4B:
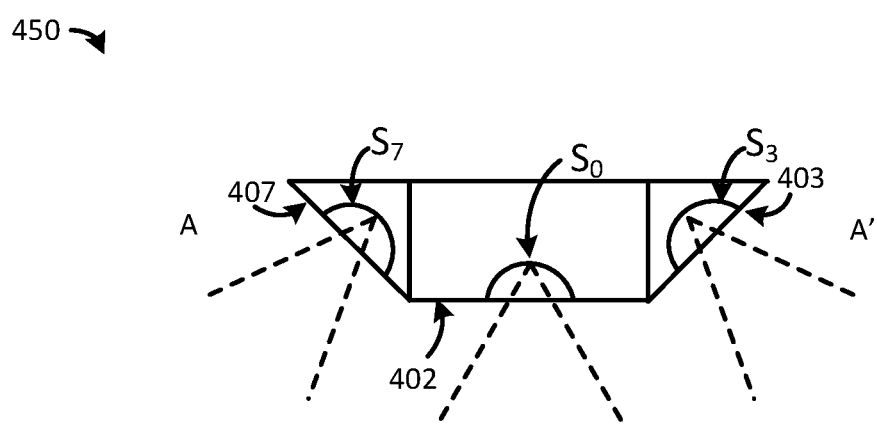
FIG. 4B illustrates a cross-section of the example sensor module of FIG. 4A.

FIG. 4A illustrates an active surface view of one example sensor module 400 that contains a plurality of time of flight (TOF) sensors. FIG. 4B illustrates a cross-section 450 of the example sensor module of FIG. 4A. Turning first to FIG. 4A, example sensor module 400 may be positioned in or on a ceiling so that an active surface including surface portions 402, 403 and 407 opposes a ceiling surface. Surface portion 402 may be generally parallel to the ceiling surface when the sensor module 400 is in an operating position. Example sensor module 400 includes nine TOF sensors S0, S1, . . . , S8. Example sensor module 400 may then be understood to have 9 axes with one axis for each TOF sensor. Eight sensors S1, . . . , S8 are distributed about a perimeter of the active surface of the sensor module 400 and one sensor S0 is centered on central surface portion 402 of the sensor module 400. Each TOF sensor S0, S1, . . . , S8 has a corresponding field of view. In one nonlimiting example, the field-of-view of each TOF sensor S0, S1, . . . , S8 may be about 30°. It may be appreciated that a relatively larger field-of-view may result in overlapping fields of view of adjacent TOF sensors.

Turning now to FIG. 4B, the cross-section 450 is oriented in the FIG. 4B so that the active surface portion 402 faces generally downward. Surface portions 403 and 407 are oriented at an angle relative to central surface portion 402. TOF sensors S3 and S7 are positioned in or on surface portions 403 and 407, respectively. The angle of surface portions 403 and 407 may be selected to provide a target combined field-of-view for sensor module 400.

It may be appreciated that sensor module 400 illustrates one example distribution of TOF sensors in a sensor module. Other example sensor modules may include more or fewer TOF sensors, angles between surface portions may be larger or smaller, field-of-view may be larger or smaller and the sensor module may be larger or smaller, consistent with the present disclosure.

Thus, a patient monitoring system, consistent with the present disclosure, may include one or more sensor modules and each sensor module may include one or more TOF sensors. Each sensor module may be configured to operate as a stand-alone unit and/or a plurality of sensor modules may be configured to communicate with each other and to operate together. Each sensor module and/or each TOF sensor may be strategically positioned in a patient room configured to monitor patient activity. Captured TOF data may then be utilized to determine a sequence of elevation maps that provide an indication of room occupant activity while preserving patient privacy. In other words, the TOF data may generally not provide a camera quality image.

Turning again to FIG. 1, in operation, initially, TOF logic 130 (e.g., of primary sensor module 110) may be configured to acquire baseline room elevation map data. Baseline room elevation map data corresponds to a patient room elevation map when the patient room does not contain an occupant. For example, TOF logic 130 may retrieve the baseline room elevation map data from data store 134. In another example, TOF logic 130 may be configured to capture TOF data from TOF sensors 140-1, . . . , 140-N and to determine the baseline room elevation map data. In this example, TOF logic 130 may then be configured to store the baseline room elevation map data in data store 134.

TOF logic 130 may then be configured to determine whether the room is occupied, i.e., whether the room contains a room occupant. Such determination may be based, at least in part, on captured TOF data. Whether the room is occupied may be determined based, at least in part, on a comparison of a current room elevation map with the baseline room elevation map. However, this disclosure is not limited in this regard.

If the room is not occupied and has been unoccupied for a number of hours, whether the room is vacant may be determined. As used herein, a vacant room is a room that has been unoccupied for at least a threshold number of hours and/or does not have an assigned patient. If the room is vacant, an updated baseline room elevation map data may be determined. For example, monitor logic 132 may be configured to classify the room as vacant if the room has been unoccupied for a number of hours corresponding to a length of a shift (e.g., 8 hours, or 12 hours). In another example, monitor logic 132 may be configured to query the facility management system 104, if the room as been unoccupied for a period of time greater than a threshold number of hours to ascertain whether the room is has an assigned patient. The threshold number of hours may be set by policy. Monitor logic 132 may then be configured to classify the room as vacant, based, at least in part, on a response from the facility management system 104.

If the room is not classified as vacant (and not occupied), TOF logic 130 may be configured to repeat capturing TOF data and repeat determining whether the room is occupied. If the room is classified as vacant, TOF logic 130 may be configured to determine an updated baseline room elevation map data. TOF logic 130 may then be configured to store the updated baseline room elevation map data in data store 134. It may be appreciated that updating the baseline elevation map data is configured to capture changes in location of room elements and to facilitate room occupant activity classification.

If the room is occupied, TOF logic 130 may be configured to capture TOF data from TOF sensors 140-1, . . . , 140-N, periodically, at a time interval. In one example, the TOF data may be captured from one sensor module, e.g., primary sensor module 110. In another example, the TOF data may be captured from a plurality of sensor modules, e.g., primary sensor module 110 and one or more other sensor modules 112-1, 112-2, . . . , and/or 112-M. TOF logic 130 of primary sensor module 110 may then be configured to determine and store a current elevation map data in data store 134. For example, current elevation map data may correspond to a difference between a ceiling height in a time of flight distance for a pixel or pixels over a combined field-of-view of the sensor module. TOF logic 130 may be configured to repeat (e.g., periodically) capturing the TOF data and determining and storing a sequence of elevation map data sets in data store 134.

A presence of a room occupant may then be determined based, at least in part, on a difference between a current elevation map and the baseline elevation map. Activity of each room occupant may then be monitored. Monitoring the activity of a selected room occupant may include determining a distance vector and/or a velocity vector associated with the selected room occupant. The distance vector and/or the velocity vector may be determined based, at least in part, on a difference between two elevation map data sets in the sequence of elevation map data sets. In other words, the time sequence of elevation map data sets allows determining a displacement (i.e., distance vector), a velocity and/or a change in velocity for a selected room occupant.

Monitor logic 132 (e.g., of primary sensor module 110) may then be configured to classify an activity of the selected room occupant based, at least in part, on the distance vector and/or based, at least in part, on the velocity vector associated with the selected room occupant. The monitor logic 132 may be trained using a machine learning technique. In other words, distance vector data and velocity vector data may be associated with occupant activity in a way that facilitates machine learning. A trained monitor logic may then be configured to provide an occupant activity indicator based, at least in part, on determined distance vector data and/or velocity vector data. In one nonlimiting example, monitor logic 132 may be trained initially using supervised learning.

In an embodiment, principal components analysis may be utilized to extract direction and rate of motion associated with a movement velocity of the selected room occupant. In another embodiment, a pattern classification technique may be implemented to recognize and categorize patterns that are associated with selected types of movement and positions. In this manner, room occupant activity may be monitored and classified without capturing room occupant identity information, thus preserving patient privacy while also protecting patient safety and well-being.

Monitor logic 132 may be further configured to communicate room occupant activity classification to the facility management system 104. Room occupant activity may be classified as acceptable or unacceptable. Room occupant activity classified as acceptable may be stored in a log file in data store 134 and/or communicated to the facility management system 104. Features associated with the acceptable room occupant activity may then be extracted and utilized to facilitate learning and improving classification operations. Room occupant activity classified as unacceptable may trigger monitor logic 132 to provide a notification to the facility management system 104. In some embodiments, selected unacceptable room occupant activities may cause monitor logic 132 to trigger an alarm.

Figure 5:
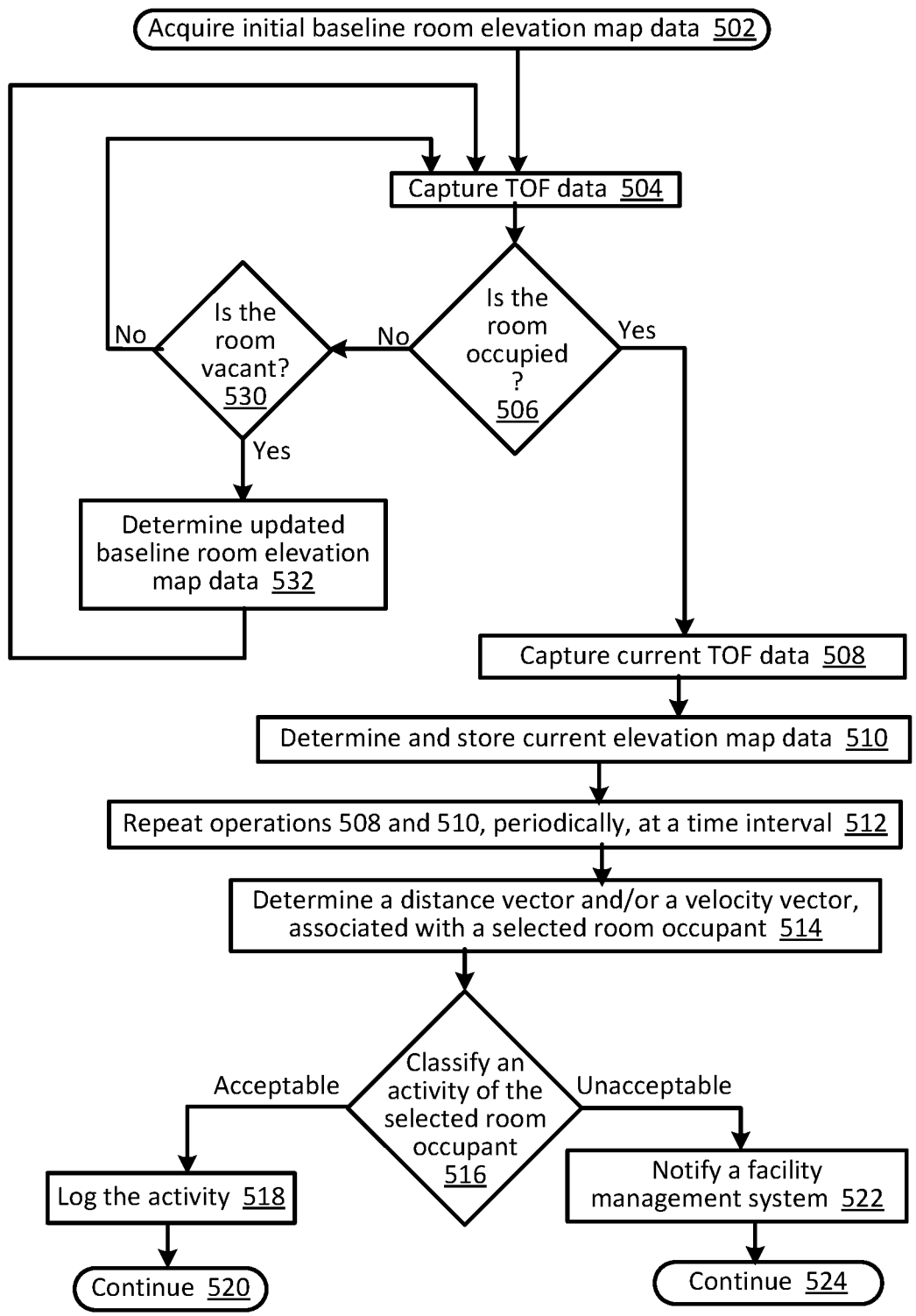
FIG. 5 a flowchart of patient monitoring operations according to various embodiments of the present disclosure.

FIG. 5 is a flowchart 500 of patient monitoring operations according to various embodiments of the present disclosure. In particular, the flowchart 500 illustrates capturing TOF data and classifying room occupant activity while avoiding invading patient privacy. The operations may be performed, for example, by patient monitoring system (e.g., sensor module(s) 110, 112-1, 112-2, . . . , and/or 112-M) of FIG. 1.

Operations of this embodiment may begin with acquiring an initial baseline room elevation map data at operation 502. The initial baseline room elevation map data may be acquired prior to initiating normal operation of the patient monitoring system. A baseline room elevation map data corresponds to the room being unoccupied, i.e., without room occupants present. TOF data may be captured at operation 504. For example, TOF data may be captured from one or more TOF sensors positioned in or on the ceiling of the patient room. Whether the room is occupied may be determined at operation 506. If the room is not occupied, whether the room is vacant may be determined at operation 530. Determining whether the room is vacant may include querying a facility management system and/or may be based, at least in part, a duration of a time period in which the room is unoccupied. If the room is not vacant, program flow may return to operation 504. If the room is vacant, an updated baseline room elevation map data may be determined at operation 532. Program flow may then return to operation 504. Updating the baseline room elevation map data is configured to capture, for example, changes in location of room elements.

If the room is occupied, then current TOF data may be captured at operation 508. Current elevation map data may then be determined and stored at operation 510. Operation 512 may then include repeating operations 508 and 510, periodically, at a time interval. For example, operations 508 and 510 may be repeated for a time period, until the room becomes unoccupied and/or until a reset signal is received. A distance vector and/or a velocity vector, associated with a selected room occupant, may be determined at operation 514. An activity of the selected room occupant may be classified at operation 516. If the classification corresponds to acceptable, then the activity may be logged at operation 518. Program flow may then continue at operation 520. If the classification corresponds to unacceptable, a facility management system may be notified at operation 522. Notification of the facility management system may include triggering an alarm, depending on the specific activity. Program flow may then continue at operation 524.

Thus, TOF data may be captured and room occupant activity classified while avoiding invading patient privacy.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors including one or more individual instruction processing cores, state machine circuitry, and/or firmware that stores instructions executed by programmable circuitry. The logic may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, a field-programmable gate array (FPGA), a programmable logic device (PLD), a complex programmable logic device (CPLD), etc.

Processor circuitry 120 and/or 150 may each include, but are not limited to, a single core processing unit, a multicore processor, a microcontroller, an application-specific integrated circuit (ASIC), a field programmable gate array (FPGA), a programmable logic device (PLD), etc.

Memory circuitry 122 and/or 152 may each include one or more of the following types of memory: semiconductor firmware memory, programmable memory, nonvolatile memory, read only memory, electrically programmable memory, random access memory and/or flash memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A sensor module for monitoring of a patient while maintaining patient privacy, the sensor module comprising:
    a processor circuitry;
    a memory circuitry;
    at least one time of flight (TOF) sensor, configured to capture a sequence of data sets of TOF data while positioned in or on a ceiling in the patient room, such that each respective data set is captured periodically at a time interval, the at least one TOF sensor being associated with one or more pixels, wherein the at least one sensor is not configured to identify specific persons;
    a TOF logic configured to determine a sequence of elevation maps of at least a portion of a patient room, the TOF logic further configured to determine at least one of a distance vector and a velocity vector associated with a selected room occupant based, at least in part, on a plurality of elevation maps in the sequence of elevation maps, each elevation map determined based, at least in part, on the respective TOF data set of the sequence of data sets; and
    a monitor logic configured to classify an activity of the patient as acceptable or unacceptable based, at least in part, on the at least one of the distance vector and the velocity vector of the patient, to determine a number of room occupants based, at least in part, on a selected elevation map, to log the activity of the patient if the activity of the patient is acceptable, to notify a facility management system if the activity of the patient is unacceptable, and to notify the facility management system if the number of room occupants determined is above or below a threshold,
    wherein an acceptable activity is any activity which is not an unacceptable activity, and wherein the unacceptable activity is selected from the group consisting of:
        (a) the patient shows no movement for a period of time greater than a threshold value,
        (b) the distance and/or velocity vectors associated with the patient are greater than a threshold for at least a predefined time period,
        (c) the patient spends longer than a threshold period of time in the bathroom,
        (d) a second room occupant is on the bed with the patient, and
        (e) the patient is resisting a caregiver.

2. The sensor module according to claim 1, wherein the monitor logic is trained using a machine learning technique.

3. The sensor module according to claim 1, wherein the TOF data set is captured from a plurality of TOF sensors.

4. The sensor module according to claim 1, wherein the monitor logic is configured to receive TOF data from a secondary sensor module.

5. A method of monitoring a patient, comprising:
capturing a sequence of data sets of time of flight (TOF) data, each respective data set captured periodically at a time interval by at least one TOF sensor positioned in or on a ceiling of the patient room, the at least one TOF sensor being associated with one or more pixels, wherein the at least one sensor is not configured to identify specific persons;
determining, by a time of flight (TOF) logic, a sequence of elevation maps of at least a portion of a patient room, each elevation map determined based, at least in part, on the respective TOF data set of the sequence of data sets;
determining, by the TOF logic, at least one of a distance vector and a velocity vector associated with a selected room occupant based, at least in part, on a plurality of elevation maps in the sequence of elevation maps;
classifying, by a monitor logic, an activity of the patient as acceptable or unacceptable based, at least in part, on the at least one of the distance vector and the velocity vector of the patient;
determining, by the monitor logic, a number of room occupants based, at least in part, on a selected elevation map; and
classifying an activity of the patient as acceptable or unacceptable based, at least in part, on the at least one of the distance vector and the velocity vector of the patient, logging the activity of the patient if the activity of the patient is acceptable, notifying, by the monitor logic, a facility management system if the activity of the patient is unacceptable, and notifying the facility management system if the number of room occupants determined is above or below a threshold,
wherein an acceptable activity is any activity which is not an unacceptable activity, and wherein the unacceptable activity is selected from the group consisting of:
  (a) the patient and shows no movement for a period of time greater than a threshold value,
  (b) the distance and/or velocity vectors associated with the patient are greater than a threshold for at least a predefined time period,
  (c) the patient spends longer than a threshold period of time in the bathroom,
  (d) a second room occupant is on the bed with the patient, and
  (e) the patient is resisting a caregiver.

6. The method of claim 5, wherein the monitor logic is trained using a machine learning technique.

7. The method of claim 5, wherein the TOF data set is captured from a plurality of TOF sensors.

8. The method of claim 7, wherein the plurality of TOF sensors is included in a single sensor module.

9. A non-transitory computer readable storage device having stored thereon instructions that when executed by one or more processors result in the following operations comprising: the method according to claim 5.

10. A system for monitoring of a patient, while maintaining patient privacy, the system comprising:
a primary sensor module; and
at least one secondary sensor module coupled to the primary sensor module,
the primary sensor module comprising:
  a processor circuitry,
  a memory circuitry,
  at least one time of flight (TOF) sensor configured to capture a sequence of data sets of TOF data while positioned in or on a ceiling in the patient room, such that each respective data set is captured periodically at a time interval, the at least one TOF sensor being associated with one or more pixels, wherein the at least one sensor is not configured to identify specific persons,
  a TOF logic configured to determine a sequence of elevation maps of at least a portion of a patient room, the TOF logic further configured to determine at least one of a distance vector and a velocity vector associated with a selected room occupant based, at least in part, on a plurality of elevation maps in the sequence of elevation maps, each elevation map determined based, at least in part, on the respective TOF data set, and
a monitor logic configured to classify an activity of the patient as acceptable or unacceptable based, at least in part, on the at least one of the distance vector and the velocity vector of the patient, to determine a number of room occupants based, at least in part, on a selected elevation map, to log the activity of the patient if the activity of the patient is acceptable, and to notify a facility management system if the activity of the patient is unacceptable,
wherein an acceptable activity is any activity which is not an unacceptable activity, and wherein the unacceptable activity is selected from the group consisting of:
  (a) the patient and shows no movement for a period of time greater than a threshold value,
  (b) the distance and/or velocity vectors associated with the patient are greater than a threshold for at least a predefined time period,
  (c) the patient spends longer than a threshold period of time in the bathroom,
  (d) a second room occupant is on the bed with the patient, and
  (e) the patient is resisting a caregiver.

11. The system according to claim 10, wherein the monitor logic is trained using a machine learning technique.

12. The system according to claim 10, wherein the TOF data set is captured from a plurality of TOF sensors.

13. The system according to claim 10, wherein the monitor logic is configured to receive TOF data from each secondary sensor module.

* * * * *